United States Patent Office 3,434,173
Patented Mar. 25, 1969

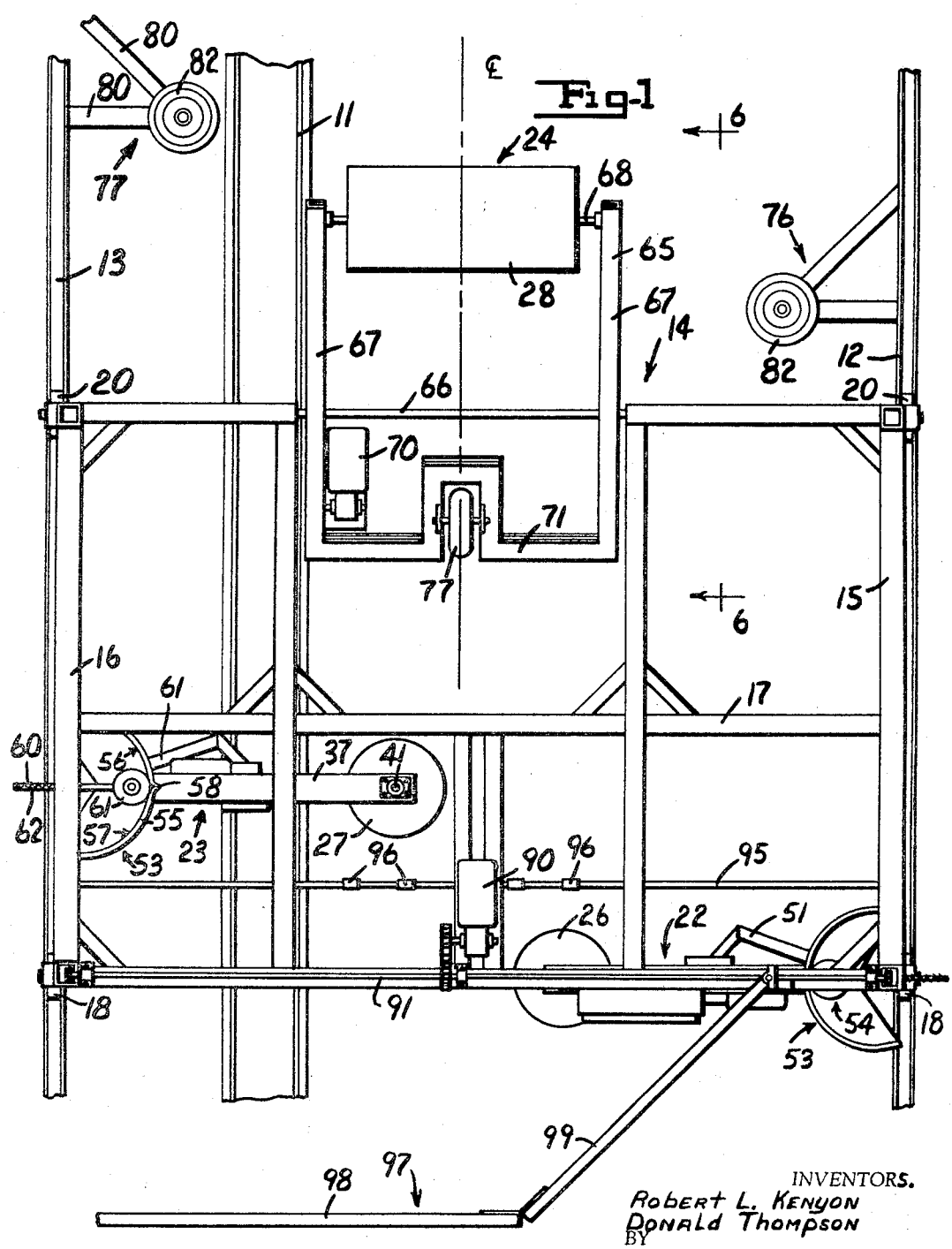

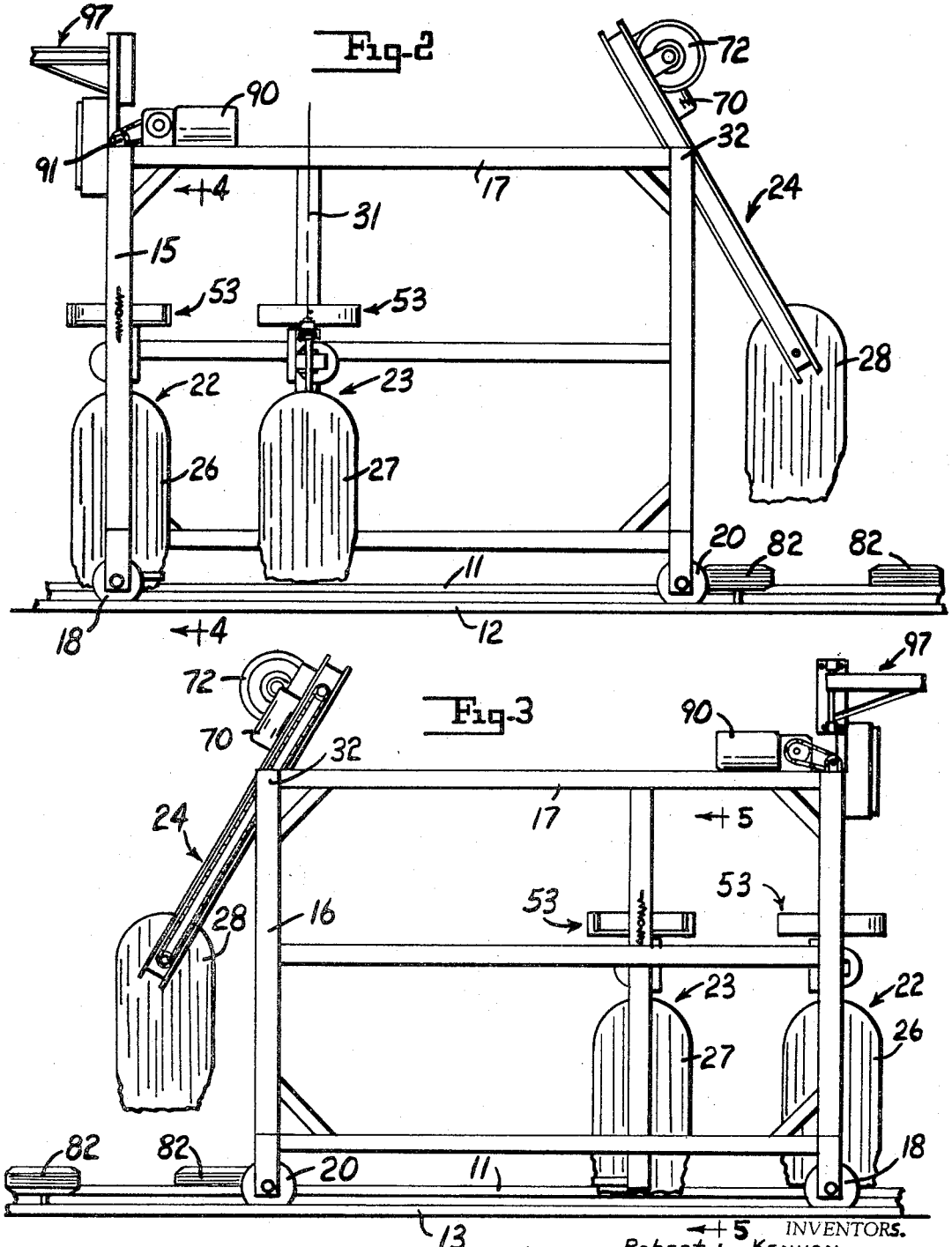

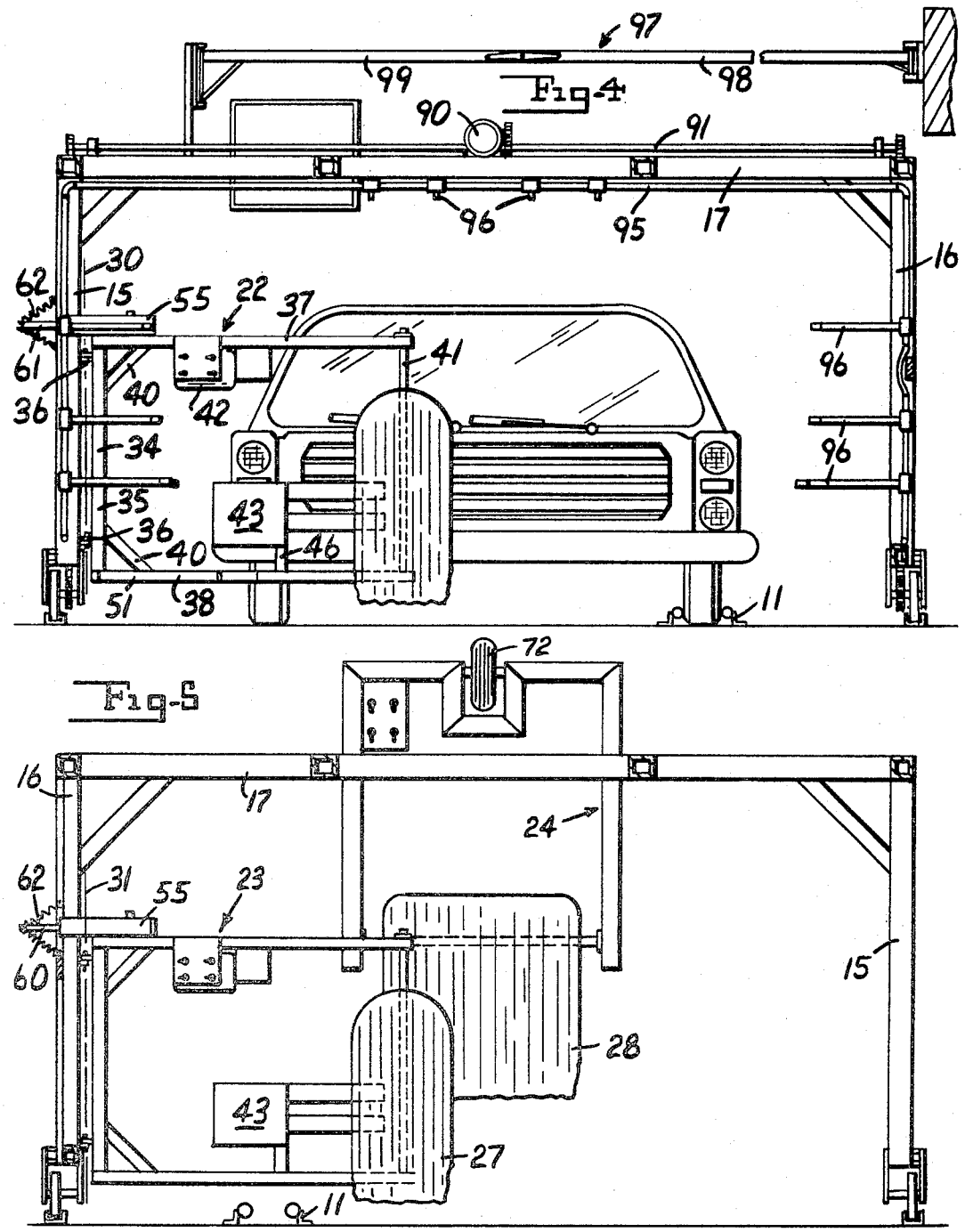

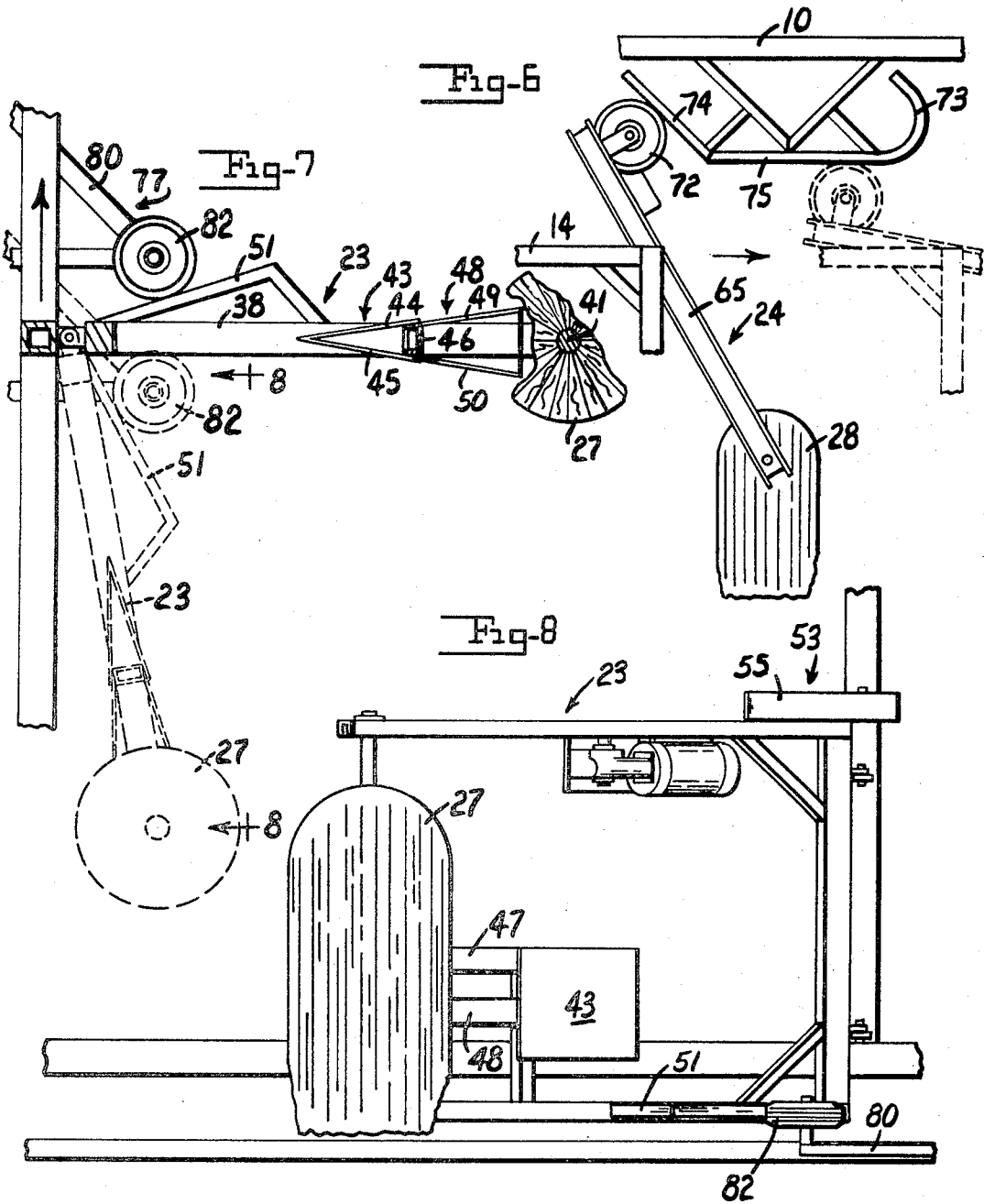

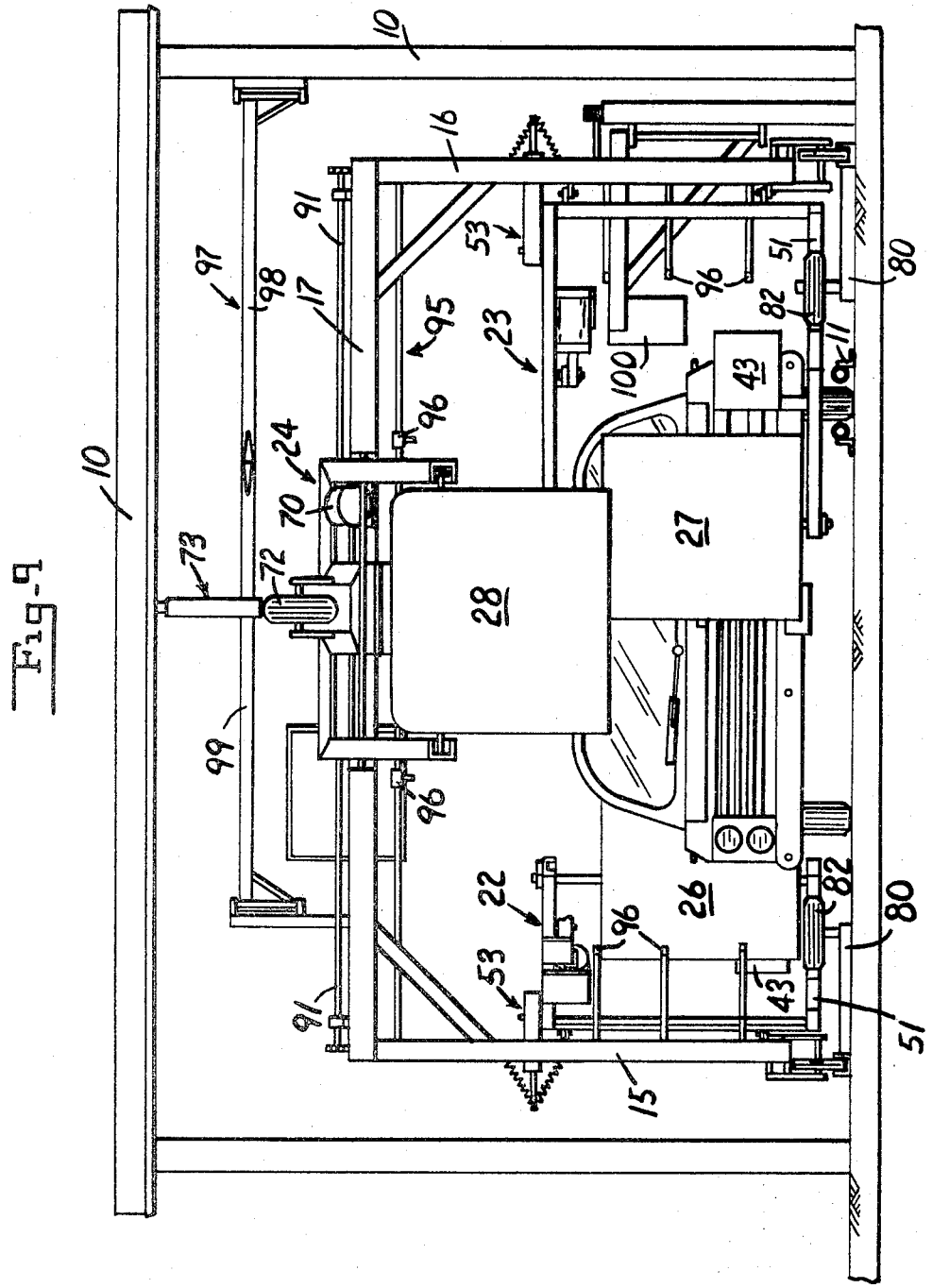

3,434,173
VEHICLE WASHING APPARATUS
Robert L. Kenyon and Donald Thompson, Missoula, Mont., assignors, by mesne assignments, to Ken-Vac Corporation, Missoula, Mont., a corporation of Montana
Filed Dec. 4, 1967, Ser. No. 687,558
Int. Cl. A46b 15/00
U.S. Cl. 15—21      10 Claims

ABSTRACT OF THE DISCLOSURE

An automatic vehicle washing apparatus is described for washing a parked vehicle. The apparatus has an inverted U-shaped carriage that moves over the vehicle from front to rear and then moves back over the vehicle from rear to front. The carriage has two side brush assemblies and an overhead brush assembly that clean the vehicle as the carriage is moving. The brush assemblies are longitudinally spaced on the carriage to prevent the interference of the brushes during the cleaning operation. Water is sprayed onto the vehicle as the carriage moves over the vehicle. The brush assemblies have deflectors that engage any sharp corners to swing the brushes outwardly to prevent the brush from becoming hooked on the corners.

Background of the invention

This invention relates to an apparatus for automatically washing vehicles such as automobiles and more particularly to apparatus that has reciprocal components that move back and forth over the automobile to perform a washing and cleaning function.

The automatic car washing industry is an extremely competitive industry requiring long-lasting, maintenance-free and economically operating equipment. Most automatic car wash installations are high production enterprises. If the apparatus frequently breaks down it represents a tremendous loss in the income producing capability of the unit. It is economically desirable that the washing apparatus be completely automatic so that no attendant or operator is required to perform or operate the cleaning and washing operation.

One of the principal objects of this invention is to provide an economical and maintenance free apparatus for washing automobiles that requires a minimum of capital investment.

An additional object of this invention is to provide an apparatus for washing automobiles that has a minimum of moving parts to minimize wear and frequency of maintenance.

It is a further object of this invention to provide an apparatus for cleaning parked automobiles with brushes that move along the contour of the automobile in which the brushes are arranged so that the peripheries of the brushes do not intersect or interfere with each other.

An additional object of this invention is to provide an inexpensive means for moving cleaning brushes out of the path of the vehicle at the conclusion of the washing and cleaning cycle.

A further object of this invention is to provide means for preventing the brushes from becoming hooked or entangled with sharp corners of the automobile.

A further object of this invention is to provide a washing apparatus that may be utilized for washing any model of automobile independently of the length or height or shape.

A further object of this invention is to provide an inexpensive washing apparatus that may be purchased by small entrepreneurs for providing neighborhood business that heretobefore were financially prohibitive.

These and other objects of this invention will become apparent upon the reading of the following detailed description of a preferred embodiment of this invention.

Brief description of the drawings

A preferred embodiment of this invention is illustrated in the accompanying drawings in which:

FIG. 1 is a fragmentary plan view of the washing apparatus emphasizing a reciprocal washing carriage that embodies several of the principles of this invention;

FIG. 2 is a fragmentary side elevation view of the reciprocal washing carriage taken from the right side as shown in FIG. 1;

FIG. 3 is a fragmentary side elevation view of the other side of the washing carriage particularly emphasizing the longitudinal relationship of side and overhead cleaning brush assemblies with respect to each other;

FIG. 4 is a cross sectional view taken along line 4—4 in FIG. 2 when the carriage has moved forward toward a parked automobile;

FIG. 5 is a cross sectional view taken along line 5—5 of FIG. 3 when the carriage has moved forward toward a parked automobile;

FIG. 6 is a fragmentary detail view showing in side elevation a cam means for deflecting an overhead brush assembly out of the path of the automobile when the carriage is moved to the starting position, the overhead brush assembly is shown in phantom in the deflected position removed from the path of the automobile;

FIG. 7 is a fragmentary detail plan view of one of two side brush assemblies in relationship to a cam means for deflecting the side brush assembly out of the path of the automobile when the carriage moves back to the starting position;

FIG. 8 is a fragmentary elevational view taken along line 8—8 in FIG. 7 emphasizing the cam means for deflecting the side brush assembly from the path of the automobile when the carriage moves to the starting position; and FIG. 9 is a rear elevation view of the apparatus showing the carriage moving forward for cleaning an automobile in which one side brush is shown cleaning one side of the automobile with the other side brush cleaning a portion of the front of the automobile.

Detailed description of the preferred embodiment

Referring now in detail to the drawings, the vehicle washing apparatus has an outer stationary frame or enclosure 10 shown in FIG. 9. The outer frame may be of a substantially enclosed configuration similar to a carport or may be an open framework. The stationary frame or enclosure 10 is aligned along a longitudinal center line L (FIG. 1). A vehicle wheel guide or track 11 (FIGS. 1 and 9) is positioned parallel with the longitudinal center line L and to one side for enabling the vehicle driver to laterally center the vehicle with respect to the longitudinal center line of the washing apparatus.

Two parallel rails 12 and 13 (FIG. 1) are mounted parallel to and equidistant from longitudinal center line for supporting a reciprocal carriage 14. The carriage 14 is normally located on the track forward of the automobile as may be particularly seen in FIGS. 4 and 9. The carriage 14 has a substantially inverted U-shaped configuration with two leg or side frames 15 and 16 and a cross frame 17 that extends between the side frames elevated above the vehicle (FIGS. 4, 5 and 9). The carriage 14 has a pair of front wheels 18 and a pair of rear wheels 20 (FIGS. 2 and 3).

The carriage 14 moves from a starting position in front of the automobile past the automobile and then moves back to its original starting position. For purposes of illustration, forward movement of the carriage is defined as the movement counter to the direction in which the vehicle is facing.

The carriage 14 has two side brush assemblies 22 and 23 that are pivotally mounted to the carriage side frame 15 and 16 respectively. A top or overhead brush assembly 24 is pivotally mounted on the carriage cross frame 17. The side brush assemblies have vertical side brushes 26 and 27 respectively that are utilized in cleaning the front, sides, and rear of the vehicle. The top or overhead brush assembly 24 includes a top or overhead brush 28 for cleaning the hood, top and trunk of the vehicle. Although the cleaning elements 26, 27 and 28 are referred to as brushes, it should be appreciated that the term is used broadly to include mop arrangements as well as bristles.

As may be particularly seen in FIGS. 4 and 5, the side brush assemblies 22 and 23 are pivotally mounted to their respective carriage side frames for pivotal movement about vertical pivot axis 30 and 31 respectively.

One of the principal features of this invention is that the vertical pivot axes 30 and 31 are offset along the longitudinally center line L a sufficient horizontal distance so that the periphery of the side brushes 26 and 27 do not intersect. This eliminates entangling of the brushes and the inefficiencies that would otherwise occur in cleaning the mid area of the front and rear of the automobile.

The top or overhead brush assembly 24 is mounted for pivotal movement about a horizontal pivot axis 32 (FIGS. 2 and 3) that is spaced from the vertical pivot axes 30 and 31 a sufficient horizontal distance so that the periphery of the overhead brush 28 does not intersect with either of the peripheries of the side brushes 26 or 27. For purposes of definition the front of the carriage 14 as viewed in FIG. 2 is to the left and the rear of the carriage is to the right, whereas in FIG. 3 the front of the carriage is to the right and the rear is to the left. Utilizing this defininition, the side brush assembly 22 is positioned longitudinally forward of the side brush assembly 23. The top or overhead brush assembly 24 is longitudinally spaced behind the side brush assembly 23. In this arrangement, the side brush 26 will engage the front of the automobile before the side brush 27. The longitudinal distance between the side brush assemblies 22 and 23 and the top brush assembly 27 is sufficient so that side brushes 26 and 27 are moving along the side of the automobile when the top brush engages the front of the hood.

The side brush assembly 22 as illustrated in FIG. 4 has a frame 34 which is pivotally mounted to the carriage side frame 15. The frame 34 includes an upright frame member 35 that has brackets that are pivotally mounted to brackets extending from a side frame by pivot pins 36 that define the vertical pivot axis 30. The side frame 34 has an upper arm member 37 and a lower arm member 38 that extends horizontally outwardly from the frame upright member 34 for supporting a vertical brush shaft 41 at the ends thereof. The arm members 37 and 38 are rigidly supported on the upright member 35 by braces 40. The brush shaft 41 is rotated by a reversible electrical motor 42 that is mounted to the arm member 37. The motor 42 drives the shaft 41 through a sprocket and chain arrangement that interconnect the motor with the brush shaft 41.

A deflector frame 43 (FIGS. 4 and 7) is mounted on the arm member 38 between the brush shaft 41 and the upright frame member 35 for preventing the brush shaft 41 from being caught on the sharp corners of the automobile. The deflector frame 43 as may be seen in FIG. 7 includes two converging deflector plates 44 and 45 that are attached to an upright frame member 46. The converging plates extend from the upright frame member 46 towards the pivot axis of the side brush assembly 22. As shown in FIGS. 4 and 7 two box arms 47 and 48 extend from the upright frame member 46 toward the brush shaft 41. Each of the box arms 47 and 48 have sides 49 or 50 (FIG. 7) that extend outwardly for engaging the sharp corners of the automobile before the brush shaft 41 approaches the corners to deflect the side brush assembly outwardly to prevent the brush shaft 41 from becoming caught on the sharp corner. It should be noted that the converging plates 44 and 45 and the sides of the box arms 49 and 50 prevent the brush shaft 41 from being caught on the sharp corners of the automobile independently of the direction the carriage is moving.

The frame member 34 also includes a brace or cam element 51 (FIGS. 1, 7 and 8) that is mounted to the rear side of the lower arm frame member 38 for assisting in the deflection of the side brush assembly 22 when the carriage moves to the starting position.

Urging means operatively interconnect the carriage side frames 15 and 16 and the side brush assemblies 22 and 23 respectively for biasing the brush assemblies 22 and 23 into perpendicular orientations to the movement of the carriage and to the longitudinal center line of the apparatus as is shown in FIGS. 1, 2 and 3. The urging means for brush assembly 23 may be seen in detail in FIG. 1. The urging means includes a cam means 53 mounted on the arm frame members 37 for engaging and deflecting a resiliently biased cam follower means 54 as mounted on the side frame 16. More particularly the cam means 53 includes a contoured shaped plate 55 that defines curved cam surfaces 56 and 57. The cam surfaces 56 and 57 are symmetrical about a vertical plane that extends through the vertical pivot axis of the brush assembly and the brush shaft 41. The contour of each of the surfaces 56 and 57 is such that the distance from the vertical pivot axis of the assembly 23 decreases as you move outwardly from the apex 58 of the curved shaped plate 55.

The cam follower means 54 includes a rod 60 that is slidably mounted on the side frame 15 for movement in a horizontal direction perpendicular to the longitudinal center line of the apparatus and intersecting the vertical pivot axis of the side brush assembly 22. A wheel or roller 61 is mounted on the end of the rod for riding over the cam surfaces 56 or 57. Adjustable springs 62 interconnect the side frame and the other end of the rod 60 for biasing the wheel 61 against the contoured shaped cam plate 55.

Since the distance between the pivot axis of the brush assembly and the cam surfaces 56 and 57 decrease from the apex 58, the resilient force of the springs 62 on the rods 60 increase as the side brush assembly 22 is pivoted in either direction from the perpendicular neutral position. In this manner a bias force is applied to the side brush assembly 22 urging the assembly into perpendicular orientation.

The side brush assembly 23 as previously mentioned is pivotally mounted on the other side frame 16 for pivotal movement about the vertical pivot axis 31. The side brush assembly 23 is substantially a mirror image of the side brush assembly 22 and the specific elements will not be discussed in any detail.

The top or overhead brush assembly 24 has a rectangular frame 65 (FIG. 1) that is pivotally mounted on a shaft 66 with a portion of the frame extending from both sides of the shaft 66. The frame 65 has two longitudinal frame members 67 with a brush shaft 68 mounted at the lower ends of the longitudinal frame members 67.

The brush shaft 68 is rotated by a reversible electrical motor 70 that is mounted to one of the longitudinal frame members 67. A chain and sprocket drive arrangement interconnects the motor of the shaft 68. A transverse frame member 71 extends between the upper ends of the longitudinal frame members 67. A rotatable wheel 72 is mounted on the transverse member 71 to serve as a cam follower.

A downwardly projecting overhead cam 73 (FIGS. 6 and 9) is mounted to the stationary frame 10 at the starting position of the carriage. The projecting overhead cam has an inclined section 74 (FIG. 6) and a substantially horizontal section 75. The inclined section 74 is centrally located in the path of the rotatable wheel 72 so that when the carriage returns to the starting position, the wheel 72 first engages the inclined section 74 to pivot the horizontal overhead brush 28 upwardly out of the path of the vehicle. Further rearward movement of the carriage as is shown by dotted lines causes the overhead frame assembly 24 to swing the overhead brush assembly to a substantially horizontal position.

The apparatus has cam means for deflecting the side arm assemblies 22 and 23 against the sides of the carriage as the carriage returns to the starting position to move the brushes from the path of the parked vehicle. The cam means includes two stationarily mounted cam assemblies 77 and 76 (FIGS. 1, 7 and 8). The cam assembly 77 includes brackets 80 that extend inwardly from the rail 13 as shown in FIG. 1. A horizontal rotatable wheel 82 is mounted to the brackets at the same elevation as the brace 51 of the side brush assembly 22. When the carriage returns to the starting position, the brace 51 engages the wheel 82 and causes the side brush assembly 23 to pivot to the side and out of the path of the vehicle as is shown in FIG. 7. The cam assembly 76 is substantially a mirror image of the cam assembly 77 for deflecting the other side assembly 22 to the side as the carriage returns to the starting position. FIG. 8 shows the side brush assembly 23 pivoted outwardly to the side to permit the vehicle to move through the carriage after it has been washed.

The carriage 14 is moved back and forth by a motor 90 (FIG. 1) that is mounted on the cross frame 17. The motor 90 rotates a shaft 91 that extends outwardly to the side frame 15 and 16. The drive arrangement extends from a shaft 91 downwardly to front wheels of the carriage as may be particularly seen in FIGS. 2 and 3.

The apparatus has a water spray system 95 (FIG. 4) that is mounted on the carriage side frames and cross frames for delivering water to a plurality of nozzles 96 that project inwardly for spraying water on the vehicle as the carriage moves back and forth.

Electrical lines and flexible water lines interconnecting the stationary housing 10 and the carriage are supported by an umbilical frame 97 (FIGS. 1, 4 and 9). As shown in FIG. 1, the umbilical frame has two members 98 and 99 that are hinged together to accommodate the motion of the carriage.

To operate the automatic car washing apparatus the automobile driver drives the automobile into the housing 10 with the wheels on one side of the automobile located in the guide 11 to laterally center the automobile with respect to the apparatus. The driver moves the automobile forward until he is adjacent to a money meter where he inserts the appropriate coins to initiate the washing operation. The money meter 100 (FIG. 9) is located within the stroke of the carriage. The money meter senses that the proper coinage has been deposited therein and activates motor 90 to move the carriage from the starting position. When the carriage is in the starting position, the top brush assembly is substantially horizontal with the rotatable wheel 82 engaging the horizontal section 75 of the projected overhead cam 73 as shown in dotted lines in FIG. 6. The brush assemblies 22 and 23 are initially deflected to the side by the wheel cams 82.

As the carriage moves forward the side brush assemblies 22 and 23 swing inwardly to a substantially perpendicular orientation by the urging means. The top brush assembly swings downwardly by gravity to a substantial depending orientation.

The brush 26 engages the front of the vehicle approximately midpoint to begin the cleaning operation. As the carriage continues to move forward the rotating brush 26 progresses from the midpoint of the automobile towards the right side of the automobile. The side brush assembly 22 pivots toward the side frame 15 as the brush rounds the right front corner of the vehicle. FIG. 9 shows the carriage moving forward with the side brush 26 moving along the right side of the automobile and the side brush 27 engaging the front of the automobile approximately midpoint and moving to the left side of the automobile.

The brush 27 moves from the midpoint of the front of the automobile toward the left side and then around the corner as the side brush assembly 23 swings toward the side frame 16 to trail the vertical pivot axis 31. After the brush 27 has rounded the left front corner of the vehicle, the top brush initially engages the hood and begins to move over the hood.

When the brush 26 moves past the rear right corner of the vehicle it swings inwardly to a substantially perpendicular orientation. Likewise, when the side brush 27 moves past the left rear corner of the vehicle, it also swings inwardly to a substantially perpendicular orientation to the longitudinal center line of the apparatus.

After side brushes 26 and 27 have passed the automobile, the top brush moves along the trunk of the vehicle and then swings downwardly into a substantial depending orientation.

After the vehicle is moved forward a prescribed distance, the motor 90 is reversed to start the carriage moving rearward to make its second pass over the vehicle. Likewise the motors 42 and 70 are reversed to reverse the rotation of the brushes 26, 27 and 28. The overhead brush 28 initially engages the trunk of the vehicle and begins to move over the trunk and into the top of the vehicle. The side brush 27 then engages the rear of the vehicle approximately midpoint and begins to move outwardly to the left side to clean at least half the rear portion of the vehicle. Continual movement of the carriage then brings the side brush 26 against the rear of the vehicle at approximately midpoint. The brush 26 then moves to the right side for cleaning the rear of the vehicle. It should be noted that when the brushes engage the vehicle, they are deflected so that the shafts of the brushes trail the pivot axis of the brush assembly to give better control of the pressure urging the brush against the vehicle.

On the rearward movement of the carriage, the brush 28 is the first one to move from the front of the automobile and swings to a substantially depending position. When the brushes 27 and 26 move past the front bumper, they swing inwardly to a substantially perpendicular orientation. Further rearward movement of the carriage brings the rotatable wheel 72 into engagement with the inclined section 74 of the overhead cam 73 to pivot the top brush assembly 24 out of the path of the vehicle. Similarly the side brush assemblies 22 and 23 engage the stationary wheel cams 82 that pivot the side brush assemblies outwardly against the side frames of the carriage and out of the path of the vehicle. While the carriage is moving the water system is activated to spray water onto the vehicle to assist in the cleaning.

This completes the washing operation. The driver of the automobile then moves the vehicle forward through the carriage. In this manner the drive does not have to back the vehicle out.

From the above description, the simplicity, ease of maintenance and efficiency of the automatic washing apparatus can be appreciated.

It is understood that the above described embodiment is simply illustrative of the principles of this invention and numerous modifications and deviations from the described embodiment may be made without deviating from the principles of this invention.

What is claimed is:

1. A washing apparatus for washing a parked vehicle laterally centered on a longitudinal center line of the apparatus, said apparatus comprising:
   (a) an inverted U-shaped carriage mounted for movement along the longitudinal center line straddling the vehicle, said carriage having two transversely spaced side frames and an elevated cross frame;
   (b) two side brush assemblies pivotally mounted to opposite side frames for oscillational movements about respective axes that are longitudinally spaced a sufficient distance to prevent the interference of one side brush assembly with the other, each of said side brush assemblies includes a substantially vertical rotatable brush for cleaning at least one half of the front, all of the side and at least one half of the rear of the vehicle;

(c) a top brush assembly pivotally mounted to the cross frame of the carriage in a normally depending orientation for pivotal movement about a horizontal axis that is longitudinally spaced sufficiently from the vertical pivot axes of the side brush assemblies to prevent the interference of the top brush assembly with the side brush assemblies, said top brush has a substantially horizontally rotatable brush for cleaning the hood, top and trunk of the vehicle;

(d) brush drive means operably connected to the brushes for rotating the brushes;

(e) urging means cooperating between the side brush assemblies and the side frames for biasing the brushes towards the longitudinal center line of the apparatus; and (f) reversible drive means mounted on the carriage for moving the carriage first in one direction over the vehicle and then moving the carriage in the opposite direction back over the vehicle to the starting position to drag the rotating brushes over the surfaces of the vehicle.

2. A vehicle washing apparatus as defined in claim 1 wherein the side brush assemblies have deflector plates mounted thereon for engaging protruding corners of the vehicle as the carriage is moved back and forth to swing the side brush assemblies outwardly as the brushes approach the protruding corners to prevent the brushes from becoming hooked on the protruding corners.

3. A vehicle washing apparatus as defined in claim 1 wherein the urging means includes:

(a) a cam fixed to each of the brush assemblies, said cam having two converging cam surfaces aligned symmetrically about a plane passing through the pivot axis of the brush assembly; and (b) a spring biased cam follower mounted on each side frame in engagement with the cams for bearing against the cam to resist the angular displacement of the brush assembly from a perpendicular orientation to the longitudinal center line.

4. A vehicle washing apparatus as defined in claim 1 further comprising a fixed overhead cam mounted above and forward of the parked vehicle and wherein the top brush assembly includes a cam follower that engages the overhead cam to pivot the top brush assembly to swing the top brush assembly out of the path of the vehicle when the carriage returns to the starting position.

5. A vehicle washing apparatus as defined in claim 4 further comprising cam means mounted forward and to the side of the parked vehicle for engaging the side brush assemblies to swing the brushes out of the path of the vehicle when the carriage returns to the starting position.

6. A vehicle washing apparatus as defined in claim 1, further comprising parallel tracks mounted equidistant from the longitudinal center line for guiding the carriage back and forth from a starting position in front of the parked vehicle.

7. A vehicle cleaning apparatus as defined in claim 1 wherein the drive means for rotating the brushes includes separate electrical motors mounted on respective brush assemblies.

8. A washing apparatus for washing a parked vehicle centered on a longitudinal center line of the apparatus, said apparatus comprising:

(a) a vehicle guide for aiding the driver in centering the vehicle with respect to the apparatus;

(b) parallel tracks mounted equidistance from the longitudinal center line spaced to the side of the vehicle;

(c) an inverted U-shaped carriage mounted on wheels that ride in the tracks, said carriage has two side frames and cross frame that extends between the side frames elevated from the vehicle;

(d) a reversible motor mounted on the carriage connected to the wheels for propelling the carriage from a starting position forward of the vehicle to a position behind the vehicle and then propelling the carriage back to the starting position in front of the vehicle;

(e) a first side arm frame mounted on one side frame of the carriage for pivotal movement about a first vertical pivot axis;

(f) a first vertical side brush rotatably mounted on the first side arm frame for cleaning at least one-half of the front, all of one side, and at least one-half the rear of the vehicle as the carriage is reciprocated;

(g) a second side arm frame mounted on the other side frame of the carriage for pivotal movement about a second vertical axis;

(h) a second vertical side brush rotatably mounted on the second side arm for cleaning at least the other half of the front, all of the other side, and at least the other half of the rear of the vehicle as the carriage is reciprocated, in which the second vertical pivotal axis is longitudinally spaced from the first vertical pivot axis a sufficient distance to prevent the intersecting of the peripheries of the first and second side brushes as they are engaging the front and rear of the vehicle;

(i) an overhead brush frame mounted on the carriage cross frame for pivotal movement about a horizontal pivot axis;

(j) an overhead brush rotatably mounted on the overhead brush frame for cleaning the hood, top and trunk of the vehicle as the carriage reciprocates, in which the horizontal pivot axis is longitudinally spaced from the vertical pivot axes of the side brush frames a sufficient distance to prevent the intersection of the periphery of the overhead brush with the peripheries of the side brush assemblies;

(k) motors individually mounted on the side frames and the overhead frame for rotating the first side brush, second side brush, and the overhead brush respectively.

9. A washing apparatus as defined in claim 8 further comprising: an overhead cam means and two side cam means associated with the starting position of the carriage and mounted in the path of the overhead brush frame and the side brush frames respectively for deflecting the three brush frames out of the path of the vehicle when the carriage returns to the starting position.

10. A washing apparatus as defined in claim 8 wherein each of the side brush frames has deflector plates mounted thereon for engaging the sharp corners of the vehicle as the carriage is moving in either direction to swing the respective side brushes outwardly to prevent the side brushes from becoming hooked on the sharp corners.

References Cited

UNITED STATES PATENTS 3,271,803  9/1966  Cirino et al.

EDWARD L. ROBERTS, *Primary Examiner.*